United States Patent Office 3,103,979
Patented Sept. 17, 1963

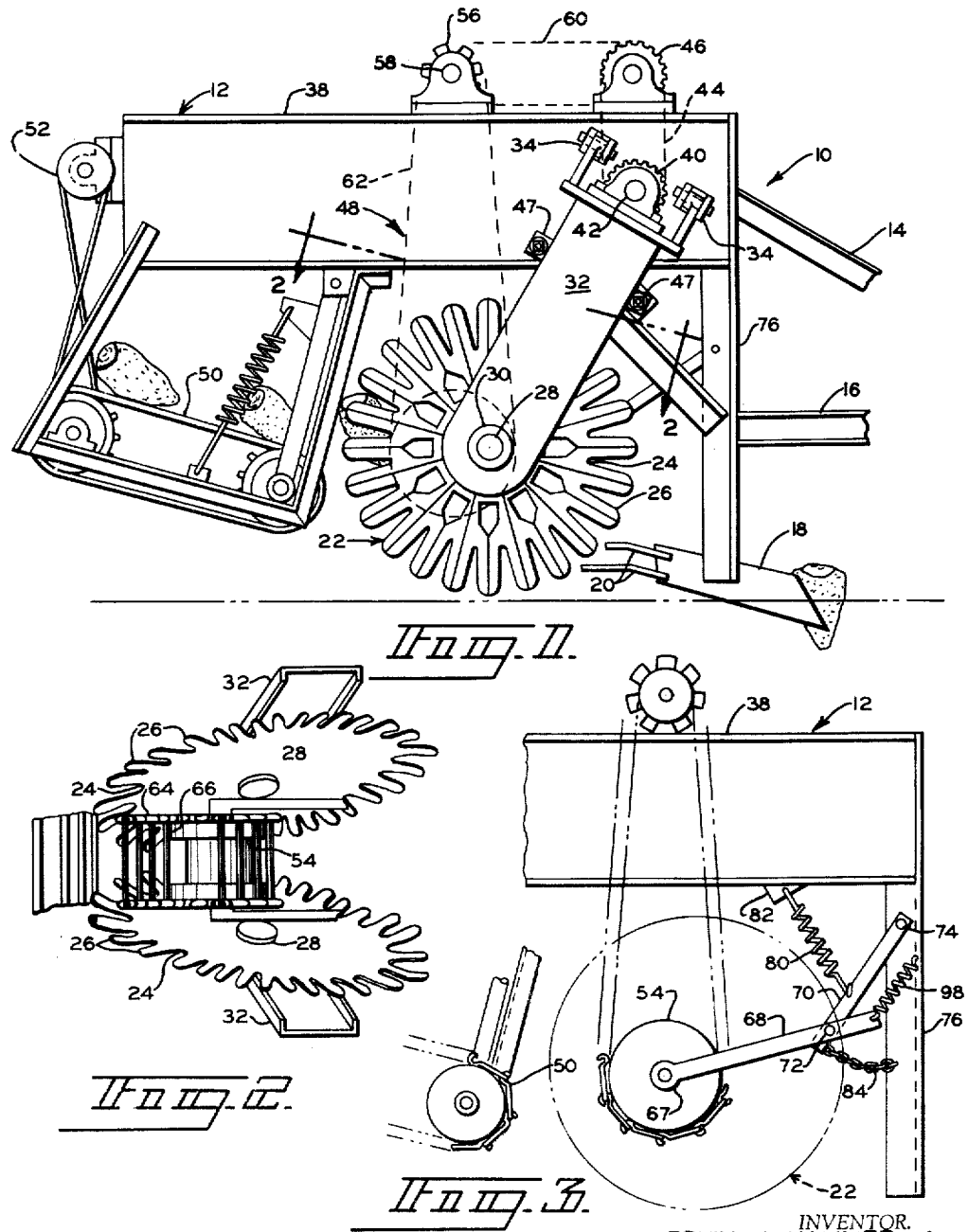

3,103,979
TRANSFER MECHANISM FOR BEET HARVESTER
Ervin J. Hammer, Box 44, Miller City, Ohio, and Orrin H.
Hammer, 1005 Tiffin St., Fostoria, Ohio
Filed Mar. 6, 1961, Ser. No. 93,701
2 Claims. (Cl. 171—58)

This invention relates to a harvester for ground crops, such as beets, radishes, and turnips, and more particularly to an ejector for a transfer mechanism used to transfer the harvested crops from one part of the harvester to another.

Ground crops are usually harvested today by a harvester pulled behind a tractor. The harvester includes a plow blade which digs up the crop, after which it is transferred by various conveyor mechanisms to a hopper or other suitable receptacle which is carried by the harvester or by a separate vehicle pulled alongside the harvester. We have discovered that the crop can be effectively transferred from the plow blade to a conveyor by means of rotary finger wheels which pick up the crop at the rear of the plow blade and transport it through an arcuate path. Near the end of this path is an ejector device which forces the crop from between the finger wheels and onto a conveyor at the rear of the harvesting machine. The latter conveyor then carries the crop either directly to the receptacle or to another conveyor and then to the receptacle. Harvesters of this nature are more fully disclosed in U.S. Patent 2,888,081, issued to Ervin J. Hammer and Orrin H. Hammer, and in a co-pending application, Serial No. 828,557 of Ervin J. Hammer and Orrin H. Hammer, filed July 21, 1959, now Patent No. 2,993,545.

Heretofore, the ejector between the finger wheels has comprised a plurality of arcuate bars or plates disposed generally in a U-shaped configuration between the finger wheels to force the ground crop from between the wheels when they have been carried through the arcuate path and are to be deposited on the conveyor. This type of ejector has been generally satisfactory but has not always ejected the beets properly. Also, slipping or rubbing of the crop on the ejector bars has occurred to some extent which damages the crop excessively.

The present invention provides a finger wheel transfer mechanism with an improved ejector comprising an endless flexible member preferably in the form of a chain having a lower end located between the finger wheels, which chain moves in the same direction as the finger wheels and substantially at the same speed. The upper end of the chain is located well above the finger wheels so that a lower portion of the chain will eject the root crop as it is carried in its arcuate path by the finger wheels. The chain provides a more effective and positive means of ejecting the crop because it engages the crop more fully than the devices heretofore used. Further, the movement of the chain aids in the ejecting process and the substantially equal speeds of the finger wheels and chain reduce abrasion of the crop.

It is, therefore, a principal object of the invention to provide an improved transfer mechanism for a root crop harvester.

Another object of the invention is to provide an improved ejecting device for a transfer mechanism of a root crop harvester, which ejecting device will more effectively and positively eject the crop from the transfer mechanism.

Still another object of the invention is to provide an ejector for a finger wheel transfer mechanism of a root crop harvester, which ejector abrades the crop to a lesser extent than heretofore.

Other objects and advantages of the invention will be apparent from the following detailed description of a preferred embodiment thereof, reference being made to the accompanying drawings, in which:

FIG. 1 is a side view in elevation of a harvester embodying the principles of the invention;

FIG. 2 is a fragmentary view partially in cross section taken along the line 2—2 of FIG. 1; and FIG. 3 is a fragmentary side view in elevation similar to FIG. 1 but with a finger wheel shown in dotted lines and its drive mechanism removed.

Referring to the drawing, and more particularly to FIG. 1, a harvester embodying the principles of the invention, generally indicated at 10, includes a main frame 12 and suitable connecting bars 14 and 16 for attaching the harvester 10 to a tractor or other suitable pulling vehicle. The harvester 10 can be suspended in a predetermined relationship with respect to the ground by means of the tractor and the bars 14 and 16, or auxiliary wheels or similar supports can be used, in which case the bars 14 and 16 are employed solely for pulling the harvester.

The harvester 10 also includes a plow blade 18 which can be of any suitable, known design and may be of V-shaped configuration or comprise two separate elements disposed in a V-shaped pattern. The blade 18 has rear extensions 20 on which the crop, specifically described hereafter as beets, are pushed back to a finger wheel transfer mechanism designated 22. The transfer mechanism 22 includes two finger wheels 24, each of which has a plurality of fingers 26 which curve inwardly as shown in FIG. 2. The wheels 24 converge downwardly and rearwardly so that the shortest distance between them is at a point below and to the rear of their centers of rotation, at a position corresponding to 7 or 8 o'clock in FIG. 1.

The wheels 24 can be supported and driven in any suitable manner. As shown, they have axles 28 which are rotatably supported in hubs 30 of support housings 32 which are pivotally connected by ears 34 and 36 to a pair of main structural members 38 of the main frame 12. The ears 34 and 36 are located toward the front of the harvester from the axles of the wheels 24 and are at an angle so that the housings 32 can extend rearwardly and convergingly to help position the wheels 24 relative to one another in the manner described above. The ears 34 are also longer than the ears 36 so that the housings 32 converge laterally, as shown in FIG. 2, which further aids in correctly positioning the wheels 24.

The wheels 24 are rotated in a clockwise direction as shown in FIG. 1 by suitable means such as driven sprockets (not shown) mounted on the axles 28, by chains (not shown) in the housings 32, and by drive sprockets 40 mounted at the upper ends of the housings 32. The drive sprockets 40, in turn, are mounted on an axle 42 which extends through the structural members 38 and has another sprocket between the members which is driven by a chain 44 and an upper sprocket 46. The upper sprocket 46 can be driven through a power take-off of the tractor or a separate motor, as is well known in the art. The housings 32 are spring loaded by springs mounted on rods 47 and are urged toward one another so that the wheels 24 can accommodate beets of varying size, being urged outwardly when a larger beet is encountered.

The finger wheels transfer mechanism 22, including the finger wheels 24, the support housings 32, and a drive system for the wheels 24 are discussed and shown in more detail in the aforementioned patent and patent application. These parts of the harvester differ from those shown in the patent and application only in that the support housings 32 are mounted farther in front of the wheels 24 and slant at a greater angle.

From the finger wheels 24, the beets are ejected by an ejector mechanism 48 embodying the principles of the invention, to be discussed in more detail later, onto a rear conveyor 50 of a conventional chain or belt type. The conveyor 50 is suitably mounted on a rear portion of the main structural member 38 and is driven through a belt and pulley arrangement 52. The conveyor 50 carries the beets either directly to a receptacle located therebehind or to another conveyor which, in turn, carries them to a receptacle located at one side of the harvester 10.

The ejector mechanism 48 includes a lower idler wheel 54, with or without teeth, and an upper sprocket 56 which is mounted on an axle 58 with a second sprocket therebehind which is driven through a chain 60 and a drive sprocket adjacent the sprocket 46. An endless member preferably in the form of a link chain 62 is located between the upper sprocket 56 and the idler wheel 54 in a position shown in FIGS. 1 and 3. In this position, the idler 54 is preferably located to the rear of the axles 28 of the wheels 24 and slightly below them.

As the beets enter the space between the wheels 24 after leaving the extension 20, they are carried between the fingers 26 and past the position at which the fingers 26 are closest together. As the beets continue to be carried further upwardly past this point, they come into contact with the link chain 62 which is spaced from the tips of the fingers 26 by a diminishing amount in an upward direction from the closest point between the fingers. Finally, the distance between the tips of the fingers 26 and the chain 62 reaches zero at the point where the chain and the path of the finger tips intersect. Thus, the beets are gradually pushed out from between the finger wheels 24 by the chain 62 at some position between the closest point of the wheels 24 and the intersection of the path of the finger tips and the chain 62, depending upon the size of the beet.

As can best be seen in FIG. 2, the chain 62 comprises a plurality of links including side links 64, which are pivotally connected, and cross links 66. These links form rather large rectangular openings into which part of each beet can extend as it comes into contact with the chain so that the chain can actually engage part of the beet and move it upwardly in cooperation with the fingers 26. By regulating the size of the drive sprockets to maintain the angular velocity of the chain 62 substantially equal to the angular velocity of the wheels 24, abrasion of the beets on the fingers 26 or the chain 62 is reduced to a minimum. The angular velocity of the chain 62 is preferably slightly greater than the angular velocity of the wheels 24 because of the difference in positions of the axes of the idler 54 and the wheels 24.

The idler 54 is resiliently held in its lower position to yield when larger beets are encountered so that the beets will not be excessively compressed between the chain 62 and the fingers 26. While this can be accomplished in many ways, as specifically shown, an axle 67 of the idler 54 is supported by a pair of lower arms 68 and a pair of upper, slanted arms 70 which are located at a steeper angle to the horizontal than the first arms. The upper ends of the arms 68 are pivotally connected to the upper arms 70 by pins 72 and the upper ends of the second arms 70 are pivotally connected to upright members 76 of the frame 12 by pins 74. A first spring 78 is attached to the arms 68 at a point spaced from the pivot pins 72, this spring being attached to a part of the member 76 below the arms 68. A second spring 80 is attached to the second arms 70 at a point spaced from the pins 74 and is attached to an ear 82 affixed to the upper structural members 38, or another suitable portion of the frame 12 at a point above the arms 70.

The lower spring 78 urges the free ends of the arms 68 downwardly so as to maintain some tension on the chain 62. Should a large beet be encountered, the spring 78 will stretch and enable the hubs 54 to move upwardly so as not to bruise the beet. Also, the spring 80 urges the free ends of the arms 70 having the pins 72 in a direction rearwardly of the harvester, which tends to push the idler 54 toward the rear. When a large beet is encountered, the idler 54 moves toward the front of the harvester and places the spring 80 in tension. The horizontal position of the lower hub 54 is determined by a stop, specifically shown as a chain 84 which is attached to the arms 70 at a point spaced from the pin 74 and to a portion of the member 76 below the pin 74.

Although the operation of the harvester 10 will be apparent from the above description, a brief résumé of its operation follows: A beet in the ground is picked up by the plow blade 18 and is pushed onto the extensions 20 by dirt and other beets subsequently picked up. From the extensions 20, the beet is carried by the finger wheel mechanism 22 in an arcuate path up past the point where the wheels 24 are closest together. The beet engages the chain 62 and is gradually pushed from between the fingers 26 and onto the rear conveyor belt 50. The large openings formed by the links 64 and 66 of the chain 62 enable the chain to help grab the beets and move them upwardly and outwardly so as to prevent the possibility of them slipping and jamming between the fingers 26 as has heretofore been possible. The chain 62 also is moved with approximately the same angular speed as the wheels 24 so that abrading of the beets on the fingers 26 or the chain links 64 and 66 is minimized. Finally, the idler 54 is free to move both vertically and horizontally by means of the spring loaded lever arms 68 and 70 so as to accommodate beets of varying size.

Various modifications of the above described embodiments of the invention will be apparent to those skilled in the art and it is to be understood that such modifications can be made without departing from the scope of the invention, if within the tenor and spirit of the accompanying claims.

We claim:

1. In a beet harvester, a frame, means supported by said frame for digging up a root crop, a pair of wheels, means for rotatably supporting said wheels by said frame behind said digging means, means for driving said wheels, an endless chain, an upper sprocket rotatably supported on said frame above said wheels, means connected to said upper sprocket for driving said chain, a lower idler located between said wheels and positioned said chain to force the crops from between said wheels when carried upwardly thereby, first lever arms rotatably carrying said idler and extending toward the forward end of said frame, second lever arm means angularly disposed with respect to the first lever arm means, said second lever arm means being pivotally attached to a portion of said frame, means connected to said second lever arm means for urging said second arm means toward the rear of said frame, and means for limiting the rearward movement of said second lever arm means.

2. The combination of claim 1 and means connected to said first arm means for urging said first arm means downwardly away from said upper sprocket.

References Cited in the file of this patent

UNITED STATES PATENTS

| | | |
|---|---|---|
| 2,679,716 | Dunkle | June 1, 1954 |
| 2,888,081 | Hammer et al. | May 26, 1959 |

UNITED STATES PATENT OFFICE
CERTIFICATE OF CORRECTION

Patent No. 3,103,979                        September 17, 1963

Ervin J. Hammer et al.

It is hereby certified that error appears in the above numbered patent requiring correction and that the said Letters Patent should read as corrected below.

Column 4, line 53, for "positioned" read -- positioning --.

Signed and sealed this 31st day of March 1964.

(SEAL)
Attest:
ERNEST W. SWIDER

EDWARD J. BRENNER

Attesting Officer

Commissioner of Patents